[19] United States Patent
Fox et al.

[11] Patent Number: 4,778,548
[45] Date of Patent: Oct. 18, 1988

[54] BONDING WOVEN CARBON FABRIC FRICTION MATERIALS

[76] Inventors: Joseph R. Fox, 621 Riverview Dr., Thiensville; David A. East, 10726 N. Wauwatosa Rd., 76W, Mequon, both of Wis. 53092

[21] Appl. No.: 77,441

[22] Filed: Jul. 24, 1987

[51] Int. Cl.[4] .................. B32B 18/00; C01B 31/00
[52] U.S. Cl. .................... 156/153; 264/29.1; 264/29.4; 264/29.5; 188/251 A; 427/249
[58] Field of Search ............ 156/153; 264/29.1, 29.4, 264/295; 427/249; 188/251 R, 251 M, 251 A; 51/281 R

[56] References Cited

U.S. PATENT DOCUMENTS

| | | | |
|---|---|---|---|
| 3,193,424 | 7/1965 | Scott | 156/153 X |
| 4,291,794 | 9/1981 | Bauer | 264/29.4 X |
| 4,514,240 | 4/1985 | Heraud | 156/89 |
| 4,700,823 | 10/1987 | Winckler | 188/251 A X |

Primary Examiner—Michael W. Ball
Assistant Examiner—Jeff H. Aftergut
Attorney, Agent, or Firm—Glenn A. Buse'

[57] ABSTRACT

A porous, woven carbon fabric friction material is bonded to a solid substrate, such as a conical transmission synchronizer, with a high temperature thermosetting adhesive, such as a synthetic rubber-phenolic resin base adhesive. Prior to applying the adhesive, a thin layer of one surface of the friction material is removed, such as by contacting the surface with a band-type sander, to break through the pyrolytic carbon coating on the substantial portion of the carbon fibers. The adhesive is applied to the abraded surface of the friction material and/or a roughened surface on the solid substrate, the friction material is clamped to the solid substrate and the thus-assembled parts are heated to at least substantially cure the adhesive. Improved bonds between the adhesive and friction material are produced and a tendency for the adhesive to "bleed through" the pores of the friction material and migrate to the friction surface during curing is significantly reduced.

15 Claims, No Drawings

BONDING WOVEN CARBON FABRIC FRICTION MATERIALS

BACKGROUND OF THE INVENTION

This invention relates to bonding carbon composite friction materials to solid substrates and, in one aspect, to adhesive bonding single ply, woven carbon fabric friction materials to metallic substrates.

Friction transmission and energy adsorption devices, such as clutches, brakes, transmissions and the like, typically include two parts which are normally disengaged and are selectively engaged to cooperatively act as a drive, brake or the like. One or both of the engaging surfaces of these parts usually is a friction material bonded to a metal part. In so-called wet transmission devices, an oil or other suitable cooling medium is force circulated about and between the engaging surfaces of the two parts.

U.S. Pat. No. 4,291,794 Bauer discloses the use of a woven carbon fabric material as the friction material for such applications. The material preferably is singly ply and consists of porous, woven carbon cloth in which individual fibers are coated with pyrolytic carbon. This patent discloses that such a material can be bonded to a metallic backing member by commercially available, high temperature adhesives. Synthetic rubber-phenolic resin base thermosetting adhesives are commonly used for this purpose.

Conventional bonding techniques used with such adhesives typically involves roughening the surface of the metal part by sandblasting, chemical etching, etc., cleaning the surfaces of the friction material and the metal part, applying a thin film of the adhesive in liquid form over the surface one or both of the parts, clamping the parts together after the adhesive has dried and then heating in an oven to cur the adhesive.

It had been found that use of commercially available synthetic rubber-phenolic resin base thermosetting adhesives and such a conventional bonding technique on woven carbon fabric friction materials does not produce a reliable bond. Even though the friction material is quite porous, and therefore an ideal candidate for superior bonding with an adhesive, the shear strength between the adhesive and the friction material, as well as the peel strength, is unacceptable for many applications. The failures almost always are between the friction material and the adhesive, while the bond between the adhesive and the metal part is acceptable.

Even though the amount of adhesive applied to the friction material is carefully controlled, there is a tendency for some to "bleed" through the pores in the friction material and migrate to the outer friction surface when the adhesive passes through the liquid phase during curing. The presence of adhesive on the outer friction surface can adversely affect its friction characteristics. When used in wet transmission devices, the pores of the friction material serve as reservoirs for the cooling oil. If a number of these pores are filled or partially filled with adhesive, there may be insufficient oil to provide the desired coolng.

SUMMARY OF THE INVENTION

An object of the invention is to provide a simple, inexpensive method for providing an improved adhesive bond between a porous, woven carbon fabric carbon friction material and a solid substrate.

Another object of the invention is to provide such a method in which bleeding of the adhesive through the pores of the friction material during curing is minimized.

Other objects, advantages and aspects of the invention will become apparent to those skilled in the art upon reviewing the following detailed description and the appended claims.

The material bonded to a solid substrate, such as a clutch plate, a transmission synchronizer or the like is a porous, woven carbon fabric friction material including individual carbon fibers coated with pyrolytic carbon. In accordance with the invention, a thin layer of the surface of the friction material to be bonded to the solid substrate is removed to break through the pyrolytic carbon coating on a substantial portion of the carbon fibers. A high temperature thermosetting adhesive, preferably a synthetic-phenolic resin base type, is applied to the resulting surface of the friction material/or and the roughened surface of the solid substrate, the friction material is clamped against the substrate with sufficient pressure to bring the mating surfaces into intimate contact and the two parts are then heated, while maintaining the clamping pressure, to cure the adhesive.

In one embodiment, surface removal is carried out by contacting the friction material with an abrasion means such as a sander or grinder and the thickness of the layer removed is at least about 0.001 inch.

In another embodiment, the adhesive is in liquid form and a continuous film is applied only to the resulting surface of the friction material. The thickness of this film preferably is sufficient to leave a film of about 0.0015 to about 0.005 inch thick when dry.

DESCRIPTION OF THE PREFERRED EMBODIMENTS

The invention can be used to bond porous, woven carbon fabric materials to various solid substrates. It is particularly useful to bond friction pads made from such a material to powdered metal cones for transmission synchronizers and will be described in connection with that application.

As used herein, the term "porous, woven carbon fabric friction material" means a weave of individual carbon fibers having an open porosity and coated with pyrolytic carbon as described in U.S. Pat. No. 4,291,792 Bauer which is incorporated herein. The material preferably is single ply and usually ha a thickness of about 0.020 to about 0.050 inch. The individual fibers can be spun fibers or continuous filaments.

The starting material for the friction pads usually is in the form of sheets about 20 inches by about 30 inches and friction pads of the desired configuration are machine punched or otherwise suitably blanked out of the sheet material. A thin layer of the pad surface to be bonded to the cone is removed, preferably by abrasion means, prior to applying the adhesive. While this surface removal step can be performed on individual pads, it is more conveniently and preferably performed by removing a surface layer on one side of the entire sheet prior to blanking out the pads.

The amount of material removed is sufficient to break through the surface of the pyrolytic carbon coating on a substantial portion of the individual carbon fibers of the friction material. Generally, the thickness of the layer removed is at least about 0.001 inch, preferably about 0.002 to about 0.005 inch. While various suitable abrasion means can be used for the surface removal, sanding or grinding is preferred because of the ease of operation and low cost. For example, the surface layer on one side of a sheet of the material can be conveniently removed by passing the sheet through a band-type sander. Even though removal of a layer about 0.001 to about 0.005 inch thick usually is enough to obtain the desired bonding, more material may be removed to achieve the desired final thickness of the material for some applications.

A high temperature thermosetting adhesive conventionally used for bonding friction pads on clutch plates, IU brake linings and the like is used for bonding the pads to the metal cones. Such adhesives typically have a synthetic rubber-phenolic resin base and cure in about 5 to about 15 minutes at temperatures of about 300 to about 425° F. The adhesive can be in liquid form and applied by spraying, brushing, roller coating or curtain coating or in film form and applied by inserting a strip thereof between the pad and the cone.

Suitable commercially available adhesives in liquid form include R-81005, a synthetic rubber-phenolic resin base adhesive marketed by the Raymark Industrial U Division of Raybestos Products, Crawfordsville, Ind., and H2S-16A, a nitrile rubber-phenolic resin base adhesive marketed by the Chemical Division of Chrysler Corporation. A suitable adhesive in film form is PLASTILOCK 601, marketed by The B. F. Goodrich Company, Akron, Ohio.

Prior to bonding, the surface of the metal cone is degreased with a suitable oil-free solvent, such as 1,1,1-trichloroethylene, and then grit blasted, chemically etched or otherwise suitably roughened to provide a clean surface and "tooth" for good adhesion. The abraded surface of the friction material can be wiped clean with a rag or the like saturated with an oil-free solvent, such as acetone, to remove all foreign materials.

When a liquid adhesive is used, a thin film thereof is applied to the abraded surface of the friction material, to the roughened surface of the cone or to both surfaces. While the adhesive can be applied to individual pads, it is more conveniently and preferably applied to the entire abraded surface of the sheet material prior to blanking out pads. A sufficient amount of the adhesive is applied to completely fill all voids and leave a continuous thin layer over the abraded surface of the sheet material and/or applicable surface of the cone when dry.

The adhesive is allowed to dry at room temperature until free of solvent. This usually takes about 6 to about 12 hours, depending on humidity conditions, air circulation, etc. The thickness of the dry film will vary, depending on the particular adhesive used, the surface(s) to which the adhesive is applied, the method of application, etc. When the adhesive is applied only to the friction material, the thickness of the dry film generally is about 0.0015 to about 0.005 inch, preferably about 0.002 to about 0.004 inch. When the adhesive is applied to both the friction material and the metal cone, the dry film on each usually is about one half the above thickness.

After the adhesive has dried, the pads are clamped against the surface of the cones in a suitable fixture which maintains a constant, substantially uniform pressure sufficient to bring the mating surface into intimate contact and prevent relative movement of the pads and cones during curing. This pressure is usually about 50 to about 300 psi. The fixtures are passed through an oven or the like at a temperature suitable for curing the adhesive for a sufficient time to at least substantially cure the adhesive, for example, for about 15 minutes at a temperature of 350° F. or about 5 minutes at a temperature of 400° F.

When an adhesive in film form is used, a strip of the adhesive of the appropriate configuration and thickness to provide the desired bonding area is inserted between each pad and the cone before they are clamped together. Otherwise, the procedure is substantially the same as that described above.

After the bonded parts are removed from the fixtures, a solubility check can be made on any exposed adhesive in the usual manner to determine whether the cure is complete.

As alluded to above, attempts were made to bond a porous, woven carbon fabric carbon friction material to powdered iron cones for transmission synchronizers with conventional high temperature thermosetting adhesives and conventional bonding techniques. The bond between the friction material and the adhesive was unacceptable even though all operating parameters of the bonding technique, including the clamping pressure and the time-temperature readings, were checked and found to be well within the required limits. Also, when the adhesive passed through the liquid phase during curing, there was a tendency for substantial amounts to "bleed through" the pores of the friction material and migrate to the friction surface. The bond between the friction material and the adhesive was poor despite the fact that the adhesive permeated the weave during this "bleed through."

Attempts to solve the poor bonding by cleaning the surface of the friction material with a variety of different solvents and by dipping the friction material into different solutions to improve surface wetting characteristics were unsuccessful. Attempts were made to reduce the "bleed through" problem by carefully limiting the amount of adhesive applied to the surface of the friction material.

Quite surprisingly, it was found that both these undesirable conditions can be substantially improved by simply removing a thin layer from the surface of the friction material as described above. Acceptable bonds can be obtained with amounts of adhesive normally used for bonding similar materials and "bleed through" can be significantly reduced without limiting the amount of adhesive applied to the friction material.

From the foregoing description, one skilled in the art can easily ascertain the essential characteristics of the invention and, without departing from the spirit and scope thereof, make various changes and modifications to adapt it to various usages.

We claim:

1. A method for bonding a porous, woven carbon fabric friction material including individual carbon fibers coated with pyrolytic carbon to a solid substrate, said method comprising the steps of:
   (a) removing from the surface of said friction material to be bonded to said substrate a thin layer of sufficient depth to break through the pyrolytic carbon coating on a substantial portion of the carbon fibers;
   (b) roughening the surface of said substrate to which said friction material is to be bonded;

(c) applying a high temperature thermosetting adhesive to one or both of said friction material and said roughened substrate surfaces;

(d) clamping said friction materials against said substrate with sufficient pressure to bring said friction material and roughened substrate surfaces into intimate contact; and (e) heating said friction material and said substrate, while maintaining said clamping pressure, at a curing temperature of said adhesive for a sufficient time to at least substantially cure said adhesive.

2. A method according to claim 1 when said friction material is single ply.

3. A method according to claim 2 wherein said step (a) carried out by contacting the surface of said friction material with an abrasion means.

4. A method according to claim 3 wherein said abrasion means is a sanding means or a grinding means and the layer of said friction material removed is at least about 0.001 inch thick.

5. A method according to claim 4 wherein said layer is about 0.002 to about 0.005 inch thick.

6. A method according to claim 1 wherein said adhesive is a synthetic rubber-phenolic resin base type.

7. A method according to claim 6 wherein the pressure applied during steps (d) and (e) is about 50 to about 300 psi and the temperature in step (e) is about 300 to about 425° F.

8. A method according to claim 6 wherein said adhesive is a nitrile-phenolic resin base type.

9. A method according to claim 6 wherein said adhesive is in liquid form and a continuous film thereof is applied only to said surface of said friction material, the thickness of said film being sufficient to leave a film of about 0.0015 to about 0.005 inch when dry.

10. A method for bonding a single ply, porous, woven carbon fabric friction material including individual carbon fibers coated with pyrolytic carbon to a metallic substrate, said method comprising the steps of:

(a) contacting the surface of said friction material to be bonded to said substrate with an abrasion means to remove a thin layer therefrom of sufficient depth to break through the pyrolytic carbon coating on a substantial portion of the carbon fibers;

(b) roughening the surface of said substrate to which said friction material is to be bonded;

(c) applyig a synthetic rubber-phenolic resin base thermosetting adhesive to one or both of said friction material and roughened substrate surfaces;

(d) clamping said friction material, against said substrate with sufficient pressure to bring said friction material and roughened substrate surfaces into intimate contact; and (e) heating said friction material and said substrate, while maintaining said clamping, at a curing temperature for a sufficient time to at least substantially cure said adhesive.

11. A method according to claim 10 wherein said abrasion means is a sanding means or a grinding means and the layer of said friction material removed is at least about 0.001 inch thick.

12. A method according to claim 11 wherein said layer is about 0.002 to about 0.005 inch thick.

13. A method according to claim 10 wherein the pressure applied during steps (d) and (e) is about 50 to about 300 psi and the temperature in step (e) is about 300 to about 425° F.

14. A method according to claim 10 wherein said adhesive is a nitrile-phenolic resin base type.

15. A method according to claim 10 where said adhesive is in liquid form and a continuous film thereof is applied only to said surface of said friction material, the thickness of said film being sufficient to leave a film about 0.0015 to about 0.005 inch when dry.

* * * * *